US 12,441,603 B2

(12) United States Patent
Briceno et al.

(10) Patent No.: US 12,441,603 B2
(45) Date of Patent: Oct. 14, 2025

(54) ANTIFREEZE SOLUTION TRANSPORT AND DELIVERY SYSTEM

(71) Applicant: EZ Antifreeze, LLC, Clancy, MT (US)

(72) Inventors: Kevin Briceno, Clancy, MT (US); Michael Ditch, Helena, MT (US)

(73) Assignee: EZ Antifreeze, LLC, Clancy, MT (US)

( * ) Notice: Subject to any disclaimer, the term of this patent is extended or adjusted under 35 U.S.C. 154(b) by 46 days.

(21) Appl. No.: 18/207,900

(22) Filed: Jun. 9, 2023

(65) Prior Publication Data

US 2024/0409391 A1    Dec. 12, 2024

(51) Int. Cl.
*B67D 99/00* (2010.01)
*E03B 7/12* (2006.01)

(52) U.S. Cl.
CPC .... *B67D 99/00* (2013.01); *B67D 2210/00136* (2013.01); *E03B 7/12* (2013.01)

(58) Field of Classification Search
CPC ...................... B67D 7/845; B67D 2210/00136
USPC ........................................................ 141/231
See application file for complete search history.

(56) References Cited

U.S. PATENT DOCUMENTS

| 8,511,351 | B2 * | 8/2013 | Watkins | .................... B64F 1/28 |
| | | | | 141/2 |
| 11,192,491 | B2 * | 12/2021 | Stumpf | .................... B67D 7/04 |
| 2016/0167806 | A1 * | 6/2016 | Rice | .......................... B64F 1/28 |
| | | | | 137/565.11 |
| 2019/0359474 | A1 * | 11/2019 | Cantadori | ................ B67D 7/62 |

* cited by examiner

*Primary Examiner* — Timothy L Maust
(74) *Attorney, Agent, or Firm* — AVEK IP, LLC

(57) ABSTRACT

A system for transport and delivery of an antifreeze solution may include a first tank configured to contain the liquid, the first tank including a first tank outlet line and a first return line. A system may include a delivery system flow connected to the first tank, the delivery system including: a pump configurable to draw the liquid through a pump inlet line in flow communication with the first tank, the pump inlet line selectively connected to the first tank outlet line, and a manifold connected to the pump, the manifold selectively configurable to direct the liquid to one of a system outlet line and the first return line for returning liquid to the first tank. A system may include a transfer tank configurable for sampling the liquid and including a transfer tank outlet line configurable for transferring the liquid to the delivery system.

10 Claims, 3 Drawing Sheets

ANTIFREEZE SOLUTION TRANSPORT AND DELIVERY SYSTEM

FIELD OF THE INVENTION

The present invention relates to a system for delivery of a liquid and more particularly to a system for transport and delivery of an antifreeze solution.

BACKGROUND OF THE INVENTION

Antifreeze solutions are used in building systems to prevent water or other solutions from freezing, and especially in buildings located in areas where freezing temperatures and/or power loss during freezing temperatures may be an issue. Examples of systems that use antifreeze solutions include fire sprinkler systems and closed radiant floor heating systems. Antifreeze solutions are commonly transported and delivered in containers such as totes, drums and pails, requiring loading and handling of the containers at each tier of a supply chain, including at a location of an end customer or user. In addition, due to life safety issues associated with antifreeze use, the National Fire Sprinkler Association has adopted standard concentration limits of glycols, such as propylene glycol, in antifreeze solutions for sprinkler systems, and therefore, it may be necessary to test a concentration of an antifreeze solution.

BRIEF SUMMARY OF THE INVENTION

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

As described herein, a system for transport and delivery of an antifreeze solution is disclosed, the system positionable in a cargo area of a vehicle. The system includes a new product tank configured to contain unused antifreeze solution, a used product tank configured to contain used antifreeze solution, a sample tank configured for sampling the antifreeze solution, and a delivery system flow connected to the new product tank, the used product tank and the sample tank. The delivery system includes a pump configurable to draw the unused or used antifreeze solution through a pump inlet line to the pump. The pump inlet line is selectively connected to one or more of the new product outlet line, the drain line from the used product tank and the sample tank outlet line. The system further includes a manifold connected to the pump, the manifold selectively configurable to direct the unused or used antifreeze solution to one or more of a system outlet line, a first return line to the new product tank, and a second return line to the used product tank. The system further includes a second pump to draw antifreeze solution to the sample tank. In one embodiment the system includes a hose removably connected to the system outlet line. In another embodiment the system includes a metering portion of the system outlet line for monitoring the antifreeze solution in the system outlet line. In yet another embodiment, the new product tank, the used product tank and the sample tank may each include a tank level indicator.

BRIEF DESCRIPTION OF THE SEVERAL VIEWS OF THE DRAWING

Embodiments of the invention are described in detail below with reference to the attached drawing figures, wherein.

Figure 1:
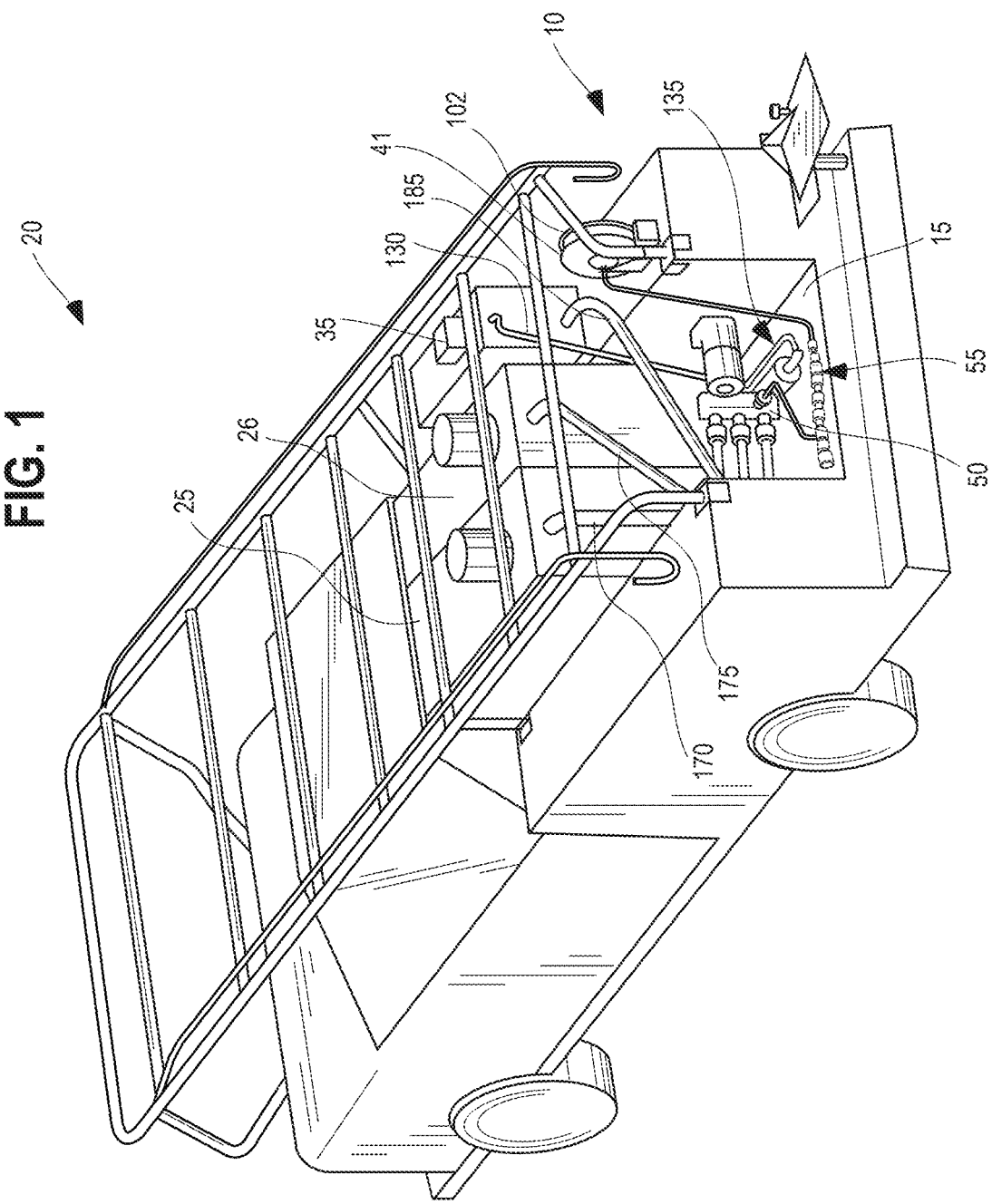
FIG. 1 shows a rear, perspective view of an antifreeze solution transport and delivery system, the system positioned in a cargo area of a vehicle and the rear of the vehicle corresponding to the rear of the system, in an embodiment.

The drawing figures do not limit the invention to the specific embodiments disclosed and described herein. The drawings are not necessarily to scale, emphasis instead being placed upon clearly illustrating the principles of the invention.

DETAILED DESCRIPTION OF THE INVENTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of the equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the technology can include a variety of combinations and/or integrations of the embodiments described herein.

Figure 2:
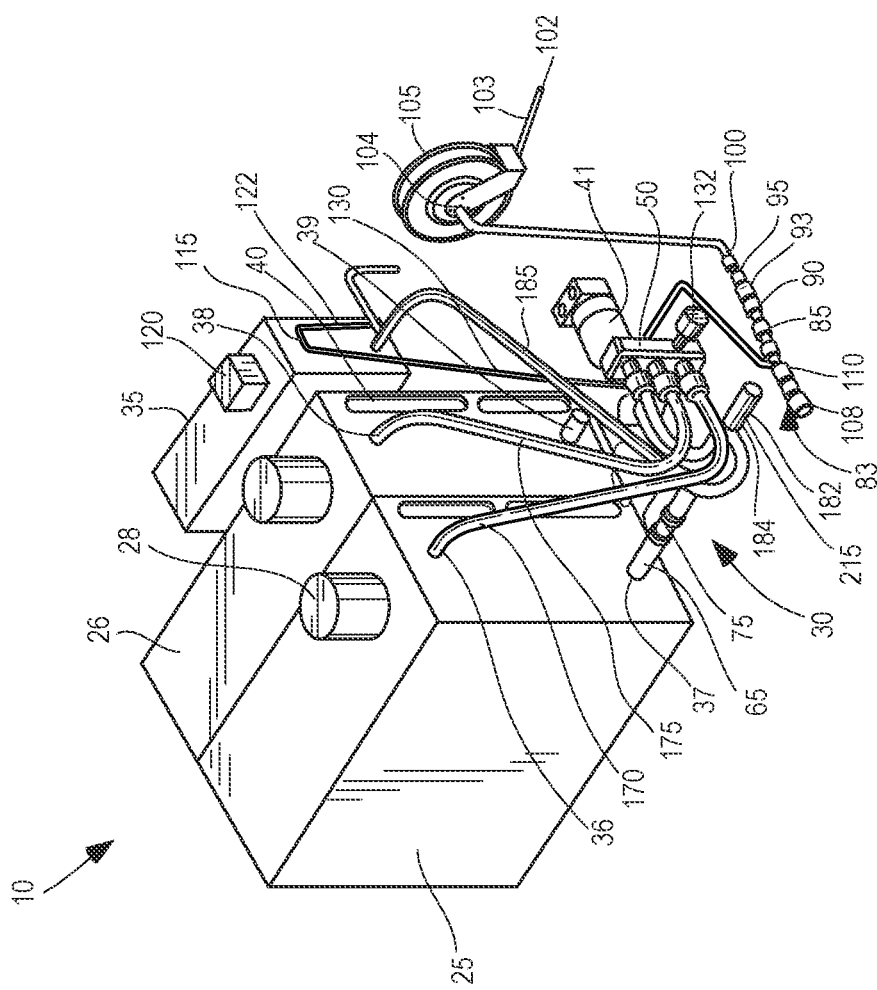
FIG. 2 shows a rear, perspective view of the antifreeze solution transport and delivery system as shown in FIG. 1, the system removed from the vehicle, in an embodiment.
Figure 3:
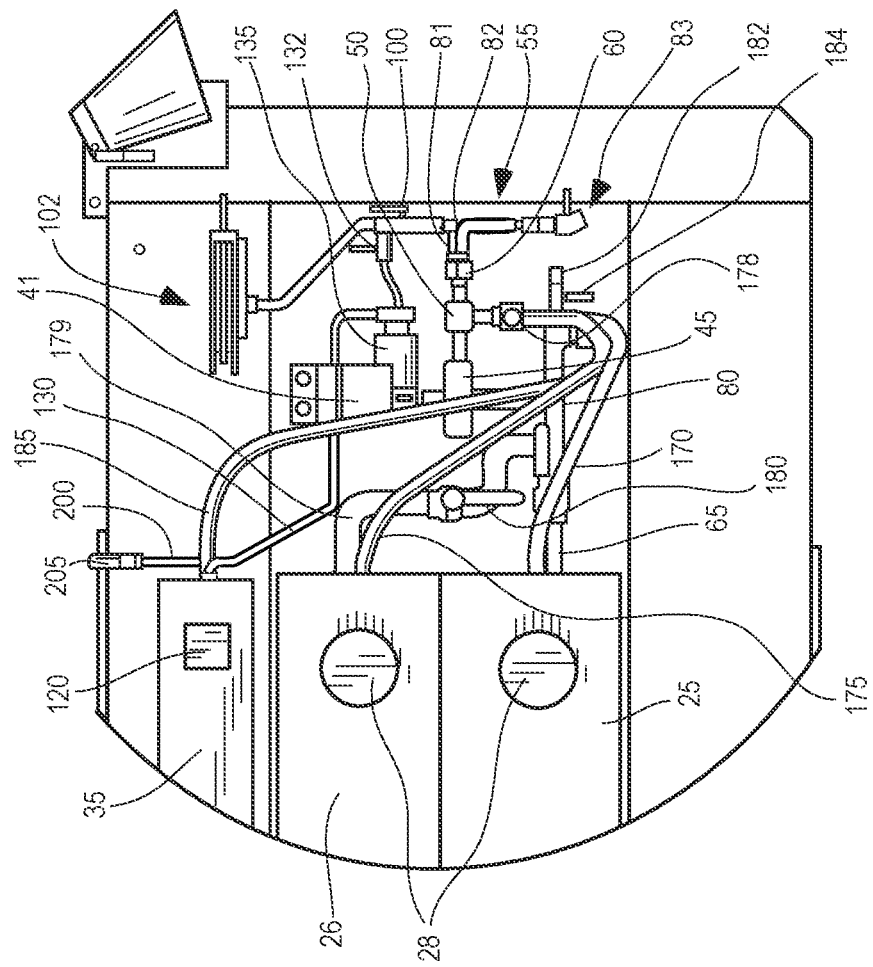
FIG. 3 shows a top plan view of the antifreeze solution transport and delivery system as shown in FIG. 1, the system removed from the vehicle, in an embodiment.

Embodiments disclosed herein describe a system 10 for transport and delivery of a liquid, and more specifically a water freeze protection solution or an antifreeze solution, the solution for use in building systems (not shown) such as fire sprinkler systems and closed radiant floor heating systems. A composition of the antifreeze solution and appropriate concentrations of the parts of the solution therein are known to a person skilled in the art and may be dependent on the application. An antifreeze solution may contain glycerin and/or glycols, such as propylene glycol or ethylene glycol, or anther antifreeze component. In the embodiment shown in FIG. 1, the system 10 is positioned and secured in a bed or cargo area 15 of a service truck or vehicle 20. As shown in FIGS. 1-3, the system 10 includes a first or unused or new product tank 25 for storage and transportation of unused or useable antifreeze solution, a second or used or bad product tank 26 for storage and transportation of used or bad antifreeze solution, a delivery system 30 for delivery of antifreeze solution to the building system, to the new product tank 25, to the used product tank 26, or to another location, and a transfer or sample tank 35 for testing unused and/or used antifreeze solution. In the following description new or unused antifreeze may be used to describe an antifreeze solution that is deliverable to a customer and used or bad antifreeze may be used to describe an antifreeze solution that is not deliverable to a customer.

The new product tank 25 and the used product tank 26 are configured similarly to store and transport antifreeze solution to or from the building systems and may be formed from a plastic or metal material that is at least durable, fire resistant, and corrosion and rust resistant. In one embodiment each tank 25 and 26 is configured to contain approximately 250 gallons of antifreeze solution, but the tanks 25 and 26 may be of any appropriate volume for transporting and delivering the antifreeze solution and the tanks 25 and 26 may be of differing sizes. It is foreseeable that the tanks 25 and 26 may be formed in any shape with a flat bottom surface to stably secure the tanks 25 and 26 in the cargo area 15 of the vehicle 20. In the embodiment shown, the tanks 25 and 26 are positioned side-by-side in the cargo area 15. The tanks 25 and 26 may be alternately positioned, such as, for example, with one tank in front of the other tank in the cargo area 15.

The tanks 25 and 26 each include a top port 28 on a top surface. The top port 28 in the new product tank 25 is for filling the tank 25 with unused antifreeze solution. The top port 28 in the used product tank 26 may be used for filling or emptying the tank 26 of used antifreeze solution. Preferably the used product tank 26 is filled with used antifreeze solution and emptied as described herein. The tanks 25 and 26 may each include a pressure relief valve to protect the tanks 25 and 26 against pressure changes during operation, such as for preventing ruptures, implosions or explosions.

In the embodiment shown, the new product tank 25 includes an inlet or tank fill port 36 extending from a side of the tank 25, preferably from an upper half of the side of the tank 25, and an outlet port 37 extending from a side of the tank 25, preferably from proximate the bottom of the tank 25. Similarly, the used product tank 26 includes an inlet or tank fill port 38 extending from a side of the used product tank 26, preferably from an upper half of the side of the tank 26, and an outlet port 39 extending from a side of the tank 26, preferably from proximate the bottom of the tank 26.

A tank level indicator may be used to indicate the liquid level in each tank 25 and 26. In the embodiment show, the tank level indicator is a sight window 40, which may be incorporated on a side of each tank 25 and 26 to observe the level of the antifreeze solution in the tank. The sight window 40 preferably extends vertically on the side of each tank such that as the volume of the solution in each tank 25 and 26 increases or decreases, the level of the solution in the tank can be observed. Level or volume markings (not shown) may also be included along each sight window 40 to indicate to what extent each tank 25 and 26 is filled.

The delivery system 30 is in flow communication with the tanks 25 and 26 and includes a hydraulic or internal combustion engine or an electric motor 41 that drives a pump 45, a manifold 50 that controls the flow of the antifreeze solution from the pump and through the delivery system 30, and a connecting line 55 of a system outlet line 60 for monitoring and controlling the flow of the antifreeze solution.

The pump 45 is a power-driven pump. Such pumps may include, for example, engine driven pumps driven by means of an external engine and electric motor driven pumps. When delivering unused antifreeze solution to a building system, the pump 45 draws the antifreeze solution from the new product tank 25 and through the pump 45. In the embodiment shown the outlet port 37 of the new product tank 25 is connected to a first or new product outlet line 65 and the outlet line 65 is connected to a pump inlet line 80. The pump 45 provides the driving force for the antifreeze solution being pumped from the pump inlet line 80 and through the manifold 50 to the system outlet line 60.

The outlet line 65 includes a selectively positionable outlet line valve 75 positionable such that the outlet line 65 may be opened or closed. If unused antifreeze solution is being delivered to a building system, the outlet line valve 75 is in an open position. If the system 10 is functioning in another way, such as when used antifreeze solution is being drained from the used product tank 26, the outlet line valve 75 is in a closed position to prevent used antifreeze solution from entering the new product tank 25.

The system outlet line 60 includes an outlet line valve 81 for controlling the flow of antifreeze solution through the system outlet line 60. The system outlet line 60 is connected to a tee fitting 82 and the tee fitting 82 connects to the connecting line 55 for delivering antifreeze solution, such as to a building system or for disposal, and to a drain section 83 that may be used for draining antifreeze solution from the system 10.

In the embodiment shown, the connecting line 55 may include metering devices, such as one or more of a wye or Y strainer 85, a flow meter 90, a check valve 93, a gauge 95, and other devices. The wye strainer 85 is a Y-shaped fitting that includes a wire mesh straining screen within a filter leg extending from the strainer 85. The strainer 85 mechanically removes any solids or particles from the stream of the antifreeze solution. The flow meter 90 measures flow rate of the antifreeze solution passing through the delivery system 30 for delivery. The gauge 95 may be a pressure gauge and/or other indicators for measuring conditions or characteristics of the solution, such as magnitude, amount, and/or contents of the stream of antifreeze solution.

A valve 100 is an adjustable valve for regulating the flow rate through the system outlet line 60, including opening and closing the system outlet line 60. When antifreeze solution is being is being delivered to the building system through a hose assembly 102 or drained from the system 10 through the hose assembly 102, the valve 100 is in the open position, and the system outlet line 60 is in flow communication with the hose assembly 102. Alternately, when the antifreeze solution is drained from a building system to the used product tank 26 of the system 10, the valve 100 is in the closed position. This one hose may be used to draw the old and fill with new.

The hose assembly 102 includes a delivery hose 103 flow connected to a threaded hose connection 104 extending from the hose assembly 102 and a hose drum 105, the delivery hose 103 wrapped therearound. The connecting line 55 is removably connected to the threaded hose connection 104. The hose assembly 102 coils and stores the delivery hose 103, uncoiling or feeding the hose 103 as needed to reach a building system for delivery, for draining of antifreeze solution from the building system to the system 10, or for draining antifreeze solution from the system 10 for disposal. The hose assembly 102 may be a manual hose reel system in which the hose is manually wound by operation of a crank or an automatic hose reel system, including a system in which the hose is wound and uncoiled by an electric motor or wound by the action of a spring. The end of the hose 103 is removably couplable or threaded for delivery or drainage of the antifreeze solution.

The drain or discharge section 83 includes a threaded end fitting 108 for removably connecting a hose (not shown) and a drain valve 110. Preferably the drain section 83 is intended to be used as a backup or alternate method of draining the system 10. The drain valve 110 is positioned between the tee fitting 82 and the end fitting 108. The drain valve 110 is normally selectively positioned in the closed position when antifreeze solution is being delivered from or drained to the system 10. When it is desired to drain the system 10 through the drain section 83, the drain valve 110 is selectively positioned in the open position. The drained antifreeze solution is preferably collected in a receptacle for preventing loss of the antifreeze solution and/or for properly disposing of the antifreeze solution.

In the embodiment shown, the transfer or sample tank 35 is positioned adjacent the product tanks 25 and 26 and is configured similar to the tanks 25 and 26, but in a smaller form. In one embodiment the sample tank 35 is sized to contain approximately 40 gallons of antifreeze solution. The sample tank 35 may be of any appropriate size such that an accurate sample of the antifreeze solution can be taken and/or such that the sample tank is able to contain the antifreeze solution to be drained to the used product tank 26. The sample tank 35 includes a tank fill port 115 and a suction port 116. The sample tank 35 may also include a top port and/or a pressure relief valve 120 and a sight window 122 for monitoring the level of the solution in the sample tank 35.

A sample tank inlet line 130 connects the tank fill port 115 of the sample tank 35 to the connecting line 55 or to the hose assembly 102. In one embodiment, the sample tank inlet line 130 connects to the connecting line 55. In another embodiment a tee connection fitting (not shown) connects to the threaded hose connection 104 such that the connecting line 55 is connected to a first side of the tee connection fitting and the sample tank inlet line 130 is connected to a second side of the tee connection fitting.

The sample tank 35 may be flow connected to the connecting line 55 such that a sample can be taken of the antifreeze solution that is being delivered to a building system. In this regard, samples can be taken from the top (fill part) every time new antifreeze is filled in tanks (both from the new and when filled). As shown in the figures, sample inlet valve 132 on the sample tank inlet line 130 is selectively positionable to open and close the sample inlet line 130 for filling the sample tank 35 such that a sample can be taken during delivery. A pump 135 is positioned between the valve 132 and the sample tank 35 to draw the antifreeze solution through the sample tank inlet line 130 and to the sample tank 35 when the sample inlet valve 132 and valve 100 are in an open position. The valve 132 can be closed and the pump 135 turned off during delivery of the antifreeze solution when samples are not being taken.

The sample tank 35 may also be flow connected to the hose assembly 102 for draining antifreeze solution from a building system. During draining of the building system the valve 100 is in a closed position and the valve 132 is in the open position such that the pump 135 can be used to drain antifreeze solution from the hose assembly 102 to the sample tank 35. A sample can be taken of the antifreeze solution that is being drained from the building system, if desired, and the used antifreeze system can be transferred to the used product tank 26 as explained below.

Between the tanks 25, 26 and 35 and the delivery system 30 are antifreeze solution delivery lines and recycle or return lines. The discharge manifold 50 and valves on the delivery and recycle lines control a direction of the flow of the antifreeze solution through the delivery system 30. The following description includes a description of the lines and valves. A person skilled in the art would be able to position the valves on the lines to direct the flow of the new or used antifreeze through the pumps to an appropriate location.

In the embodiment shown, the discharge manifold 50 is connected to a return line 170 connected to the inlet port 36 of the new product tank 25 and connected to a second return line 175 connected to the inlet port 38 of the used product tank 26. Return lines 170 and 175 include selectively operable hose valves 178 to open or close each return line 170 and 175 to control recycle of antifreeze solution. During delivery of the new antifreeze solution to a building system or drainage of antifreeze solution from the system 10, the valves 178 are positioned in the closed position such that the antifreeze solution is pumped through to the system outlet line 60, the outlet line valve 81 being open. If delivery or drainage is stopped, the antifreeze solution in the lines can be recycled back to the tank 25 or 26, depending on the appropriate destination, by closing the outlet line valve 81 and opening the hose valve 178 on one of return lines 170 or 175.

The used product tank 26 can be drained through drain line 179 connected to outlet port 39. The drain line 179 includes drain line valve 180 that is selectively positionable. When the used product tank 26 is drained, the outlet line valve 75 on the outlet line 65 is closed to prevent contamination of unused antifreeze in the new product tank 25. The used antifreeze solution is drawn from the drain line 179 through the pump inlet line 80. The pump 45 provides the driving force for the antifreeze solution being pumped from the pump inlet line 80 and through the manifold 50 to the system outlet line 60 and to connecting line 55 that drains through the hose assembly 102 or to the drain section 83 for draining antifreeze from the system 10.

As shown in the embodiment, an end of the pump inlet line 80 may include a threaded end fitting 182 having a pump inlet line valve 184 positioned proximate the end fitting 182 and selectively positionable to open or close the end of the pump inlet line 80. As an alternative, a hose (not shown) may be attached to the end fitting 182 to draw antifreeze solution into the system 10 through the pump inlet line 80 and to a desired location.

A sample tank outlet line 185 extends from the suction port 116 at the bottom of the sample tank 35 for draining the antifreeze solution in the sample tank 35. The outlet line 185 includes a sample port 200 extending from the outlet line 185 with a sample valve 205 on the sample port 200 that may be opened for taking a sample of the antifreeze solution. The outlet line 185 is flow connected to the pump inlet line 80 and the pump 45 draws the antifreeze solution from the sample tank 35, through the outlet line 185 and through the pump inlet line 80. The antifreeze solution from the sample tank 35 may be directed though the pump 45, to a desired location, such as to the used product tank 26 or to the new product tank 25 or may be pumped out of the system 10 or may be combined with the antifreeze solution drawn from the new product tank 25 to be delivered to a building system. The outlet line 185 includes an outlet line valve 215 positioned between the sample port 200 and the pump inlet line 80 such that the outlet line 185 can selectively be opened or closed.

The system 10 can be used to supply or recharge more than one building system, limited by the volume of antifreeze solution in the new product tank 25 and the used product tank 26.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A system for transport and delivery of a liquid, comprising:
   a first tank configured to contain the liquid, the first tank including a first tank outlet line and a first return line;
   a delivery system connected to the first tank, the delivery system including:
     a pump configurable to draw the liquid through a pump inlet line in flow communication with the first tank, the pump inlet line selectively connected to the first tank outlet line, and
     a manifold connected to the pump, the manifold selectively configurable to direct the liquid to one of a system outlet line and the first return line for returning liquid to the first tank; and
   a transfer tank configurable for sampling the liquid and including a transfer tank outlet line configurable for transferring the liquid to the delivery system, the transfer tank configured to contain the liquid and the transfer tank outlet line including a port for sampling the liquid, wherein the transfer tank includes a transfer tank inlet, and the transfer tank inlet is configurable to be in flow communication with a selected one of at least the first tank during delivery of the liquid from the system and a hose for transferring the liquid to the system during draining of the liquid to the system.

2. The system of claim 1, wherein the liquid is a water freeze protection solution.

3. The system of claim 1, wherein the first tank or the transfer tank includes a tank level indicator.

4. The system of claim 1, further comprising a second tank configured to contain the liquid, the second tank including a drain line and a second return line, the drain line in flow communication with the pump inlet line and the second return line in flow communication with the manifold.

5. The system of claim 1, wherein the pump is configurable to draw liquid through the transfer tank outlet line from the transfer tank.

6. The system of claim 5, wherein the pump is configurable to pump the liquid from the transfer tank through the manifold and the manifold is selectively configurable to direct the liquid to a second tank.

7. The system of claim 1, further comprising a hose removably connected to the system outlet line.

8. The system of claim 1, further comprising a second pump to draw the liquid to the transfer tank.

9. The system of claim 8, wherein the second pump is configurable to draw the liquid from the hose in flow communication with the second pump.

10. The system of claim 1, wherein the system outlet line includes at least one gauge configured to monitor a flow of the liquid in the system outlet line.

* * * * *